United States Patent
Hakimi-Boushehri et al.

(10) Patent No.: US 10,817,891 B1
(45) Date of Patent: Oct. 27, 2020

(54) VEHICLE RISK AVERSION AND REWARD SYSTEM

(71) Applicant: STATE FARM MUTUAL AUTOMOBILE INSURANCE COMPANY, Bloomington, IL (US)

(72) Inventors: Daryoush Hakimi-Boushehri, Bloomington, IL (US); Wayne Walk, Lexington, IL (US); Melinda Teresa Magerkurth, Utica, IL (US); Andrew Joseph Zeglin, Normal, IL (US); EllaKate LeFebre, Bloomington, IL (US); Jessica Lynn Shull, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 315 days.

(21) Appl. No.: 15/791,850

(22) Filed: Oct. 24, 2017

Related U.S. Application Data

(60) Provisional application No. 62/488,419, filed on Apr. 21, 2017, provisional application No. 62/452,661, filed on Jan. 31, 2017, provisional application No. 62/443,431, filed on Jan. 6, 2017, provisional application No. 62/440,164, filed on Dec. 29, 2016.

(51) Int. Cl.
*G06Q 30/00* (2012.01)
*G06Q 30/02* (2012.01)
*G07C 5/00* (2006.01)
*G07C 5/08* (2006.01)

(52) U.S. Cl.
CPC ......... *G06Q 30/0224* (2013.01); *G07C 5/008* (2013.01); *G07C 5/0841* (2013.01)

(58) Field of Classification Search
None
See application file for complete search history.

(56) References Cited

U.S. PATENT DOCUMENTS

| | | | |
|---|---|---|---|
| 8,370,254 B1 * | 2/2013 | Hopkins, III | G06Q 40/08 705/39 |
| 9,520,006 B1 * | 12/2016 | Sankovsky | G07C 5/006 |
| 10,007,263 B1 * | 6/2018 | Fields | A61B 5/6893 |
| 10,013,697 B1 * | 7/2018 | Cote | B60W 40/09 |
| 10,366,370 B1 * | 7/2019 | Binion | G06Q 30/014 |

(Continued)

OTHER PUBLICATIONS

STIC EIC 3600 Search Report for U.S. Appl. No. 15/791,850 dated Nov. 1, 2019 (Year: 2019).*

*Primary Examiner* — Matthew T Sittner
(74) *Attorney, Agent, or Firm* — Marshall, Gerstein & Borun LLP

(57) ABSTRACT

Systems and methods are provided for identifying vehicle care that may reduce risk in fields not directly associated with a vehicle itself. One or more electronic sources may provide an indication of care (e.g., service, maintenance, or part configuration) of a vehicle by a user, and the vehicle care may be determined to be associated with a lowered risk for an entity (e.g., a home or business) operated by the same user in another field not associated with operation of the vehicle itself. In response, a user-specific reward may be generated and transmitted to the user, to further incentivize vehicle care and other risk averse behavior in the other field.

18 Claims, 10 Drawing Sheets

(56) References Cited

U.S. PATENT DOCUMENTS

| | | | |
|---|---|---|---|
| 2012/0084151 A1* | 4/2012 | Kozak | G06Q 30/02 |
| | | | 705/14.58 |
| 2013/0317736 A1* | 11/2013 | Fernandes | B60W 40/09 |
| | | | 701/400 |
| 2014/0142989 A1* | 5/2014 | Grosso | G06Q 40/00 |
| | | | 705/4 |
| 2014/0278574 A1* | 9/2014 | Barber | B60W 40/09 |
| | | | 705/4 |
| 2015/0324923 A1* | 11/2015 | Christensen | G06Q 30/0266 |
| | | | 705/4 |
| 2015/0354426 A1* | 12/2015 | Crawford | H05B 6/108 |
| | | | 60/274 |
| 2017/0145886 A1* | 5/2017 | Crawford | H05B 6/108 |
| 2019/0095822 A1* | 3/2019 | Rugel | G06Q 30/0627 |

\* cited by examiner

VEHICLE RISK AVERSION AND REWARD SYSTEM

CROSS REFERENCE TO RELATED APPLICATIONS

This Application claims the benefit of (1) U.S. Provisional Application 62/488,419, filed on Apr. 21, 2017 entitled "Pan-Telematic Behavior-Based Reward System," (2) U.S. Provisional Application 62/452,661, filed on Jan. 31, 2017 entitled "Pan-Telematic Behavior-Based Reward System," (3) U.S. Provisional Application 62/443,431, filed on Jan. 6, 2017 entitled "PAN-TELEMATIC BEHAVIOR-BASED REWARD SYSTEM," and (4) U.S. Provisional Application 62/440,164, filed on Dec. 29, 2016 entitled "PAN-TELEMATIC BEHAVIOR-BASED REWARD SYSTEM." The entire contents of these applications are incorporated herein by reference in their entirety. Additionally, the present application is related to the following co-pending U.S. patent application Ser. No. 15/791,790, filed on Oct. 24, 2017 entitled "Pan-Telematics Risk Aversion and Reward System."

FIELD OF THE DISCLOSURE

The present disclosure relates generally to identification of risk aversion with regard to a vehicle. More particularly, the present disclosure relates to identifying and/or tracking vehicle care and generating rewards to further incentivize vehicle care and other risk averse behavior.

BACKGROUND

In conventional rewards systems, a business entity such as a corporation offers rewards to its customers or users for positive behaviors directly related to metrics of the business entity itself. For example, a car insurance company may reward a customer or user who is not involved in a car accident for a period of time. Such rewards may relate to the operation of the business entity, such as in the form of a premium discount, may not relate to the operation of the business entity, such as in the form of a gift certificate to a third party, and/or may not even be desired by the customer or user.

Often times, rewards offered are created with a class of customers in mind, and thus are not tailored to each customer. For example, a business entity may offer a reward in the form of a gift certificate to a restaurant generally thought to be desirable to a broad class of customers, but not with the particular customer in mind. Conventional systems may have other drawbacks as well.

SUMMARY

The present embodiments disclose systems and methods that may generally relate to identifying vehicle care that may reduce risk not just with regard to a vehicle, but also with regard to entities in other fields (e.g., persons, homes, businesses, etc.). Vehicle care may generally be identified based upon pan-telematics data collected via mobile computing devices (e.g., wearable devices), vehicle computer systems, business-related computing devices, and/or other devices. Vehicle care may be continuously tracked, and rewards and/or recommendations may be generated to further incentivize risk aversion with regard to entities in other fields.

In one embodiment, a computer-implemented may be provided. The method may include (1) receiving, via one or more processors or one or more transceivers, from at least one electronic source, an indication of vehicle care including at least one of (i) maintenance of a vehicle, (ii) service of the vehicle, or (iii) a part installed within the vehicle, (2) determining, via the one or more processors, whether the vehicle care is associated with a lowered risk for an entity operated by the user in another field not associated with operation of the vehicle, and/or (3) in response to determining that the vehicle care is associated with the lowered risk for the entity operated by the user in the other field, (i) generating, via the one or more processors, a user-specific reward relevant to a documented interest of the user that is proportional to the vehicle care, wherein the reward further lowers the risk for the entity upon using the reward; and (ii) transmitting, via the one or more processors or the one or more transceivers, a virtual representation of, or electronic message detailing, the reward to a mobile device of the user for display, or otherwise causing the reward to be displayed to the user. The method may comprise additional, fewer, or alternate elements, including those described herein.

In another embodiment, a computer system and/or server may be provided. The computer system and/or server may include (1) one or more processors, (2) one or more computer memories comprising computer-executable instructions that, when executed by the one or more processors, causes the computer system to (i) receive, via the one or more processors or via one or more transceivers, from at least one electronic source, an indication of vehicle care including at least one of (a) maintenance of a vehicle, (b) service of the vehicle, or (c) a part installed within the vehicle; (ii) determine, via the one or more processors, whether the vehicle care is associated with a lowered risk for an entity operated by the user in another field not associated with operation of the vehicle; and/or (iii) in response to determining that the vehicle care is associated with the lowered risk for the entity operated by the user in the other field, (a) generate, via the one or more processors, a user-specific reward relevant to a documented interest of the user that is proportional to the vehicle care, wherein the reward further lowers the risk for the entity upon using the reward, and (b) transmit, via the one or more processors or the one or more transceivers, a virtual representation of, or electronic message detailing, the reward to a mobile device of the user for display, or otherwise causing the reward to be displayed to the user. The computer system may comprise additional, fewer, or alternate elements, including those described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
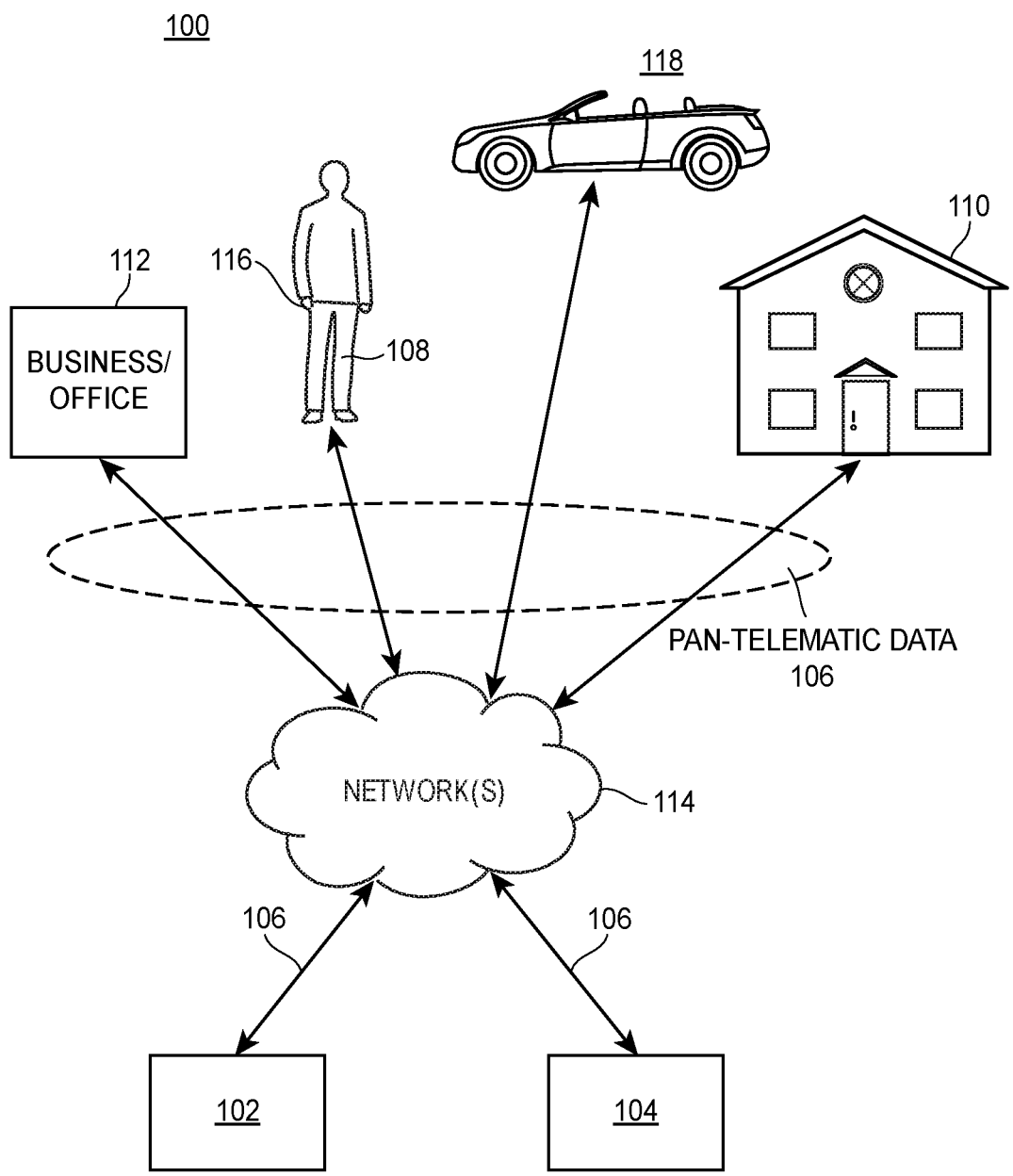
FIG. 1 illustrates a block diagram of an exemplary behavior-based reward system 100 on which the methods described herein may be implemented.

The figures depict aspects of the present embodiments for purposes of illustration only. One skilled in the art will readily recognize from the following discussion that alternate aspects of the structures and methods illustrated herein may be employed without departing from the principles of the invention described herein.

DETAILED DESCRIPTION

The present embodiments disclose, inter alia, systems and methods that may generally relate to identifying risk averse behaviors, including patterns thereof. Risk averse behavior may generally be identified based upon pan-telematics data collected via mobile computing devices (e.g., wearable devices), vehicle computer systems, home appliances and other devices, and/or business-related computing devices. Risk averse behavior may be continuously tracked, and rewards and/or recommendations may be generated to further incentivize risk averse behavior on the part of particular individuals or other entities.

Business entities, such as corporations, profit organizations, non-profit organizations, and the like typically evaluate risk pertinent to its operations. For example, a car insurance company may assess how much premium to charge its insured customers or users based upon risk associated with car accidents, taking into account various factors such as age, prior driving record, city the car is registered in, and the like. One way to measure a particular customer's risk associated with a car accident is by assigning various weights to one or more of the aforementioned factors to quantify a measure of a certain level of risk, such as accident likeliness.

However, other factors not traditionally associated with a field or application in which the entity operates may also be used to evaluate risk. For instance, a car insurance company may take into consideration the overall health of its customers, under the notion that there may be a correlation between healthy drivers and driving skills.

Risk averse behavior-based reward systems and methods are described herein. The systems and methods may collect, generate, and/or receive pan-telematics data, such as sensor data, associated with a behavior of the customer or user in a first field (e.g., health) that lowers risk for the entity operating in a second field (e.g., insurance). Pan-telematics data may refer to, and/or include, data originating from various electronic sources (home sensors, wearables, mobile device sensors, vehicle sensors, etc.) configured to an account of a customer of the entity that are affiliated with various fields. For example, an insurance company's server may not only receive data associated with the insurance field, such as car accident damages, but may also receive data associated with a different field, such as the health field, home field, business field, financial field, and other fields. Data associated with the health field may be fitness statistics from a fitness device (e.g., Fitbit, smart watch, wearable, mobile device) of the customer, such as how often the insurance company's customer went to the gym, how many miles the customer ran, and the like. As there may be a correlation between healthy drivers and driving skills, data associated with the health field may lower the risk for a company operating in the insurance field.

The systems and methods may subsequently determine whether the behavior is risk averse, and/or repeatedly demonstrated over a predetermined period of time. For example, an insurance company's server may receive fitness statistics from the fitness device to track not only how often a customer exercises, but also to determine whether the behavior is repeatedly demonstrated over a predetermined period of time.

In response to determining that the behavior has been repeatedly demonstrated over a predetermined period of time, the systems and methods may generate a customer-specific reward relevant to a documented interest of the customer that is proportional to the risk averse and/or other behavior, and further lowers the risk for the entity upon using/redeeming the reward. For example, upon determining that the customer has regularly visited the gym or committed to exercising for 3 months, the insurance company's server may generate a reward in the form of a $100 discount to the customer's favorite athletic apparel store under the notion that using/redeeming the discount would further incentivize exercise and thereby further lower risk for the insurance company.

By way of comparison, a reward in the form of a $100 discount to the customer's favorite restaurant may not incentivize exercise, and using/redeeming of such a reward may thereby not further lower risk for the insurance company. The systems and methods then may display the reward for the customer to redeem the reward, such as on the customer's mobile device (e.g., smart phone or wearable).

The system and methods may continue to periodically assess the customer's behavior to modify the reward to maintain its proportionality with the assessed behavior. For example, if the customer has regularly visited the gym or committed to exercising for another 6 months, the insurance company's server may offer an updated reward in the form of a $200 discount.

Further, the rewards offered by the system and methods herein may include evolving rewards. For instance, as the customer continues to exhibit risk averse behavior, the system and methods may offer rewards that increase in monetary value, increase in frequency of offering, and/or increase in pertinence to the customer.

Furthermore, the systems and methods herein may promote friendly competition for the offered rewards. For example, in some embodiments, the customer may view rewards earned by or available for another customer, and the customer may be offered an opportunity to match the other customer's rewards by exhibiting risk averse behaviors (e.g., equaling or exceeding risk averse behaviors exhibited by the other customer).

In some embodiments, a computer system may include a processor and one or more memory devices storing non-transitory computer readable instructions that when executed cause the processor to receive, from at least one source configured to an account of a customer of the entity, pan-telematics data associated with a behavior of the customer in a first field that lowers risk for the entity operating in a second field. The instructions may further cause the processor to determine whether the behavior is risk averse and/or repeatedly demonstrated over a predetermined period of time. In response to determining that the behavior has been repeatedly demonstrated over a predetermined period of time and/or risk averse, the instructions may further cause the processor to generate a customer-specific reward relevant to a documented interest of the customer that is proportional to the behavior and further lowers the risk for the entity upon using/redeeming the reward. The instructions may further cause the processor to display the reward.

In addition to or alternatively to collecting and analyzing telematics data (e.g., vehicle pan-telematics data) the systems and methods described herein may collect and analyze data indicative of vehicle care pertaining to the vehicle. Vehicle care may include maintenance to or service of the vehicle (e.g., a comprehensive checkup, an oil change, an air filter change, a wheel alignment, etc.) and/or installation of one or more functional and/or cosmetic parts (e.g., new brake pads, new headlights, snow tires during winter months, etc.). Vehicle care data may be utilized to generate and transmit user-specific rewards using methods and systems similar to those used to generate and transmit rewards based upon pan-telematics data, as described herein.

Because the reward piques the interest of the customer and lowers risk for the entity, such as lowering the financial risk for the entity, the systems and methods may advantageously incentivize both the customer and the entity.

Generally, pan-telematics data, as described herein, may include telematics data indicative of operation of a home, vehicle, and/or business associated with a user (e.g., an insurance customer). Additionally or alternatively, pan-telematics data may pertain to physical or other activity on the part of the user (i.e., health telematics data). Pan-telematics data may, for example, include data generated or acquired via sensors disposed in or about a home, business, or vehicle, and/or on or about a user, and such sensors may be configured to periodically and/or continuously generate or acquire telematics data. Sensors may include sensors disposed within smart devices (e.g., smart devices of a smart or autonomous vehicle, smart appliances and/or electronics disposed about a home, business or other structure, etc.) and/or within an autonomous home, business, or vehicle.

In particular, vehicle telematics data may include data indicative of operation of a vehicle, which may be a smart and/or autonomous vehicle. Vehicle telematics data may, for example, include data indicative of speed, acceleration, deceleration (e.g., braking), mileage, fuel usage, fuel efficiency, location, direction of travel, duration of driving, cornering, time of day/week/month/etc. driving, driving habits during certain road or weather conditions, and/or other data described herein as vehicle telematics data. Vehicle telematics data may include data generated or acquired via one or more smart components of a smart vehicle. Further, vehicle telematics data may be associated with an autonomous vehicle (e.g., a driverless vehicle) or semi-autonomous vehicle. In the case of an autonomous vehicle, vehicle telematics data may generally be associated with and/or attributed to a party (e.g., a vehicle owner) causing or directing the vehicle to operate.

Home telematics data generally may include data indicative of operation and/or real-time condition of a home. Home telematics data may, for example, include data indicative of operation of electronic or electric devices, light usage, utility usage, heating/cooling usage, time of day/week/month/etc. of usage, security system usage, preparation of the home in advance of home vacancy, weather conditions, or other environmental conditions, or other data indicative of operation or configuration of electric or non-electric components (e.g., locked or unlocked doors) within or about the home. In particular, home telematics data may include data indicative of operation of smart devices (e.g., smart appliances) about the home. Home telematics data may include data generated or acquired via one or more sensors about the home.

Business telematics data may include any of the telematics data described above, with respect to a business office or other workplace. Additionally or alternatively, business telematics data may include telematics data indicative of operation of office cubicles, conference rooms, etc. about the workplace. Business telematics data may include data generated and/or acquired via one or more sensors disposed about the business.

In one embodiment, what is envisioned is a reward system that allows an entity to reward customers or users for those behaviors that, although not traditionally related to the entity, have unintended consequences that benefit the entity. The envisioned reward system incentivizes its customers to behave in ways that are beneficial to the entity, by way of offering rewards that evolve (e.g., increase in monetary value, increase in frequency of offering, and/or increase in pertinence to the customer) as behaviors are repeatedly demonstrated over time. Further, what is envisioned is a reward system that generates rewards actually desired by its customers and further tailored to each customer—not to a class of customers. By incentivizing beneficial behaviors and granting beneficial rewards, a positive feedback loop may be created, whereby beneficial behavior may continue to the benefit of both the customer and the entity.

Exemplary Behavior-Based Reward System

FIG. 1 illustrates a block diagram of an exemplary behavior-based reward system 100 on which the methods described herein may be implemented. The behavior-based reward system 100 may generally be divided into front-end components, such as mobile device 102, and back-end components, such as server 104, both of which may include hardware and software applications, as well as various data communications channels for communicating data between the various hardware and software components. The mobile device 102 (e.g., a smart phone, a cellular phone, a tablet computer, a special purpose or general use computing device, smart watch, wearable electronics, home devices, and the like) may receive, via network(s) 114, pan-telematics data 106 from various sources such as mobile device-mounted sensors, home sensors (e.g., security system sensors 110), wearable electronics-mounted sensors (e.g., smart watch 116), sensors at the office (e.g., light detecting sensors 112), smart vehicles 118, vehicle sensors, vehicle telematics devices, and/or other sensors that measure a behavior of a customer 108 (e.g., actively or passively track fitness levels of the customer 108 or scan the customer 108's home or office to provide data for determining the behavior of the customer 108).

The pan-telematics data 106 may be in the form of health data, home data, image data, vehicle data, and/or other data that may provide contextual information of the customer 108 related to various fields or applications, such as how much the customer 108 is exercising, general health levels, whether the customer 108 is conserving utilities at his home or office (e.g., turned off lights when not in use to keep the electricity bill low), whether the customer 108 is using energy-efficient appliances in the home, whether the customer 108 is exhibiting risk averse driving behaviors, or other behavioral information relating to the customer 108. The vehicle data may include vehicle telematics data, such as speed, cornering, location, mileage, acceleration, and braking information.

The aforementioned sensors may be removably or fixedly incorporated within or connected to the mobile device 102, a home, and/or a vehicle, and may be disposed in various arrangements. In other embodiments, the mobile device 102 may also generate pan-telematics data 106, such as when the customer 108 carries the mobile device 102 while running to generate health data, carries the mobile device 102 while traveling or driving a vehicle, or controls various appliances in a home using a home control application on the mobile device 102.

The mobile device 102 may be configured to execute one or more algorithms, programs, or applications to receive, generate, and/or analyze various types of pan-telematics data 106 as behavior of the customer 108 in one field (e.g., health) that lowers risk for the entity operating in another field (e.g., insurance). The algorithms, programs, or applications of the mobile device 102 may be pre-configured to accept or reject pan-telematics data 106 based upon whether the behavior associated with the pan-telematics data 106 lowers risk for the entity. For instance, pan-telematics data 106 representative of fitness may be accepted because customer 108's fitness level may lower risk for the entity, whereas pan-telematics data 106 representative of excessive alcohol consumption may be rejected because customer 108's excessive alcohol consumption may increase risk for the entity (e.g., more likely to get into a vehicle collision).

The mobile device 102 may track the accepted behavior to determine whether the behavior is repeatedly demonstrated over a predetermined period of time, via an algorithm or methodology that may be dedicated to assessing the frequency and duration of such behavior for the customer 108. In response to determining that the behavior has been repeatedly demonstrated over a predetermined period of time, the mobile device 102 may generate a customer-specific reward relevant to a documented interest of customer 108 that is proportional to the behavior and further lowers the risk for the entity upon using/redeeming the reward, via an algorithm or methodology that may be dedicated to determining rewards for customer 108.

For example, pan-telematics data 106 indicative of repeatedly demonstrated behavior of customer 108 that is associated with the health field may be assigned a preconfigured weight correlated to the behavior (e.g., higher weight for longer repeatedly demonstrated behavior) and/or propensity of the behavior lowering risk for the entity, where the preconfigured weight would be used by the algorithm to generate a reward, that upon redeeming, further lowers the risk for the entity. Because the reward piques the interest of the customer 108 and lowers risk for the entity, which may lower financial risk for the entity, the behavior-based reward system 100 may advantageously incentivize both the customer 108 and the entity.

One or more of the algorithms, programs, or applications of the mobile device 102 may allow the customer 108 to document his interests, out of which rewards would be based. For instance, the one or more algorithms, programs, or applications may display preapproved merchants for the customer 108 to select. The merchants may be preapproved based upon their ability to provide a service or product for the customer 108 that lowers the risk for the entity. The one or more algorithms, programs, or applications may store such customer preferences and merchant names. The one or more algorithms, programs, or applications may select the reward based upon the customer 108's merchant selection.

The one or more algorithms, programs, or applications may also continue to periodically assess the behavior, and modify the reward to maintain proportionality with the assessed behavior. For example, if the customer 108 continues to repeatedly show demonstrated behavior, the reward evolve, such as by increasing its monetary value, increasing in frequency of offering, or increasing in pertinence to the documented interest of the customer 108.

In some embodiments, the mobile device 102 may communicate with the back-end components, such as the server 104, via network(s) 114 (e.g., wireless communication or data transmission over one or more radio links or wireless communication channels). The server 104 may receive pan-telematics data 106 that was generated or collected by the mobile device 102 and/or sensors. The mobile device 102 may be configured to send pan-telematics data 106 to the server 104 via network(s) 114 using one or more suitable communication protocols, such as a Wi-Fi direct protocol, an ad-hoc cellular communication protocol, and the like, for the server 104 to manage processing of the pan-telematics data 106. Network(s) 114 may be a proprietary network, a secure public internet, a virtual private network or some other type of network, such as dedicated access lines, plain ordinary telephone lines, satellite links, cellular data networks, or a combination thereof. Network(s) 114 may be implemented as a wireless telephony network (e.g., GSM, CDMA, LTE, etc.), a Wi-Fi network (e.g., via one or more IEEE 802.11 Standards), a WiMAX network, a Bluetooth network, and the like. The network(s) 114 may include one or more radio frequency communication links with the mobile device 102. Where the network(s) 114 comprises the Internet, data communications may take place over the network(s) 114 via an Internet communication protocol.

Although the system 100 is shown to include one customer 108, one mobile device 102 and one server 104, it should be understood that additional customers 108, mobile devices 102, and/or servers 104 may be utilized. For example, the system 100 may include a plurality of servers 104 and hundreds of mobile devices 102 and/or smart sensors, all of which may be interconnected via the network (s) 114. For example, one of the servers 104 may be dedicated to processing pan-telematics data 106 associated with the health field, another one of the servers 104 may be dedicated to processing pan-telematics data 106 associated with the home field, and/or another server 104 dedicated to processing pan-telematics data 106 associated with a vehicle field.

Furthermore, the database storage or processing performed by the one or more servers 104 may be distributed among a plurality of servers 104 in a cloud computing arrangement. This configuration may provide various advantages, such as enabling near real-time uploads and downloads of information, as well as periodic uploads and downloads of information. This may in turn support a thin-client embodiment of the mobile device 102 discussed herein.

Exemplary Block Diagram

Figure 2:
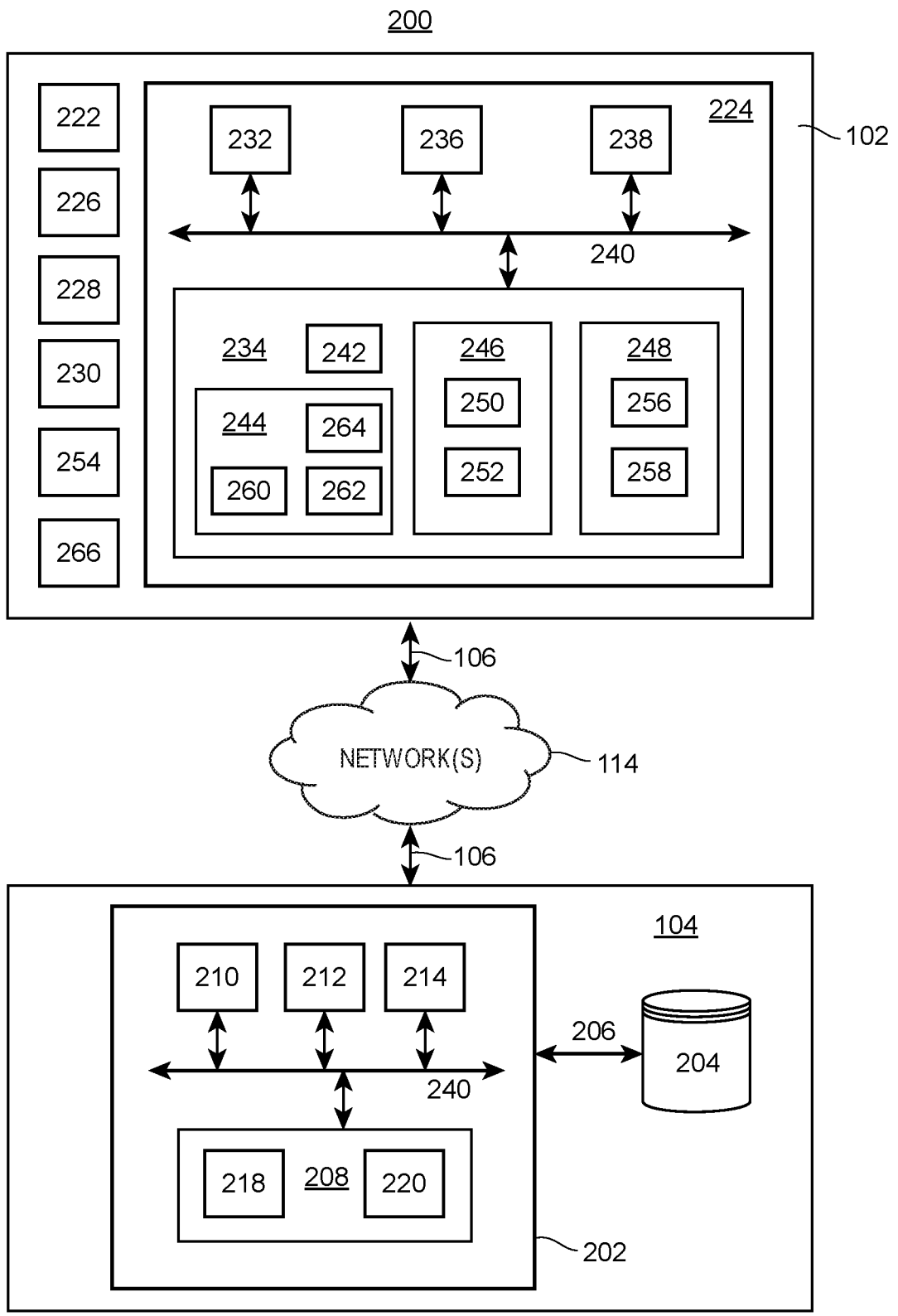
FIG. 2 illustrates a block diagram of an exemplary mobile device and server according to one embodiment.

FIG. 2 illustrates a block diagram of a behavior-based reward system 200 including mobile device 102 and server 104 consistent with the behavior-based reward system 100 of FIG. 1. The server 104 may comprise a controller 202 that is operatively connected to the database 204 via link 206. The controller 202 may also be operatively connected to the network(s) 114 via a link. The controller 202 may include the program memory 208, a processor 210, a random-access memory (RAM) 212, and an input/output (I/O) circuit 214, all of which may be interconnected via an address/data bus 216. The memories of the controller 202 may include multiple RAMs 212 and multiple program memories 208. The RAM 212 and program memory 208 may be implemented as semiconductor memories, magnetically readable memories, or optically readable memories, for example.

The program memory 208 may store various software applications, which may include the behavior tracking application 218 and the reward determination application 220. Although the behavior tracking application 218 and the reward determination application 220 are illustrated as separate applications, in some embodiments, one application may be configured to perform the functionalities of both the behavior tracking application 218 and the reward determination application 220. The behavior tracking application 218 and the reward determination application 220 may be executed by the same computer processor 262 or by different computer processors.

After the server 104 receives or collects pan-telematics data 106 from mobile device 102 via the network(s) 114, server 104 may store the received pan-telematics data in database 204, program memory 208, and/or RAM 212, and via behavior tracking application 218 stored in program memory 208 of the server 104, analyze the received pan-telematics data 106 as behavior of the customer/user 108 attributable to a particular field. The analysis may including accepting behavior that lowers risk for the entity (e.g., fitness behavior, risk averse driving behaviors, etc.), and rejecting behavior that increases risk for the entity (e.g., excessive alcohol consumption, vehicle speeding, etc.). Such analysis may be facilitated by rules incorporated in the behavior tracking application 218 that define acceptable behaviors that lower risk for the entity. In some embodiments, this analysis step may be unnecessary if the pan-telematics data 106 is, by default, associated with behavior that lowers risk for the entity.

The behavior tracking application 218 may also track the behavior to determine whether the behavior is risk averse, and/or repeatedly demonstrated over a predetermined period of time. For example, the behavior tracking application 218 may receive health data, such as the number of steps taken, miles ran, or calories burned by the customer 108 from the mobile device 102, and track the day and/or time such health data was received, as well as the frequency of receiving such health data. If the frequency exceeds a predetermined configured threshold defined by the behavior tracking application 218 (e.g., received health data for 15 days out during a period of 30 days), behavior tracking application 218 may categorize the behavior as a repeatedly demonstrated behavior.

In response to determining that the behavior has been repeatedly demonstrated over a predetermined period of time, the server 104 may generate, via reward determination application 220 stored in program memory 208, a customer-specific reward relevant to a documented interest of the customer 108 that is proportional to the behavior and further lowers the risk for the entity upon using/redeeming the reward. For example, pan-telematics data 106 indicative of behavior of customer 108 that is associated with the health field may be assigned, by the reward determination application 220, a preconfigured weight correlated to the behavior (e.g., higher weight for longer repeatedly demonstrated behavior) and/or propensity of the behavior lowering risk for the entity upon redeeming the reward, where the preconfigured weight would be keyed to an algorithm to generate the reward.

To generate the reward, the reward determination application 220 may access preapproved merchant data and customer 108's preferences stored in database 204 or program memory 208, and execute one or more functions and tasks associated with generating the reward. The server 104 may, via transceiver (not shown), communicate the generated customer-specific reward, back to the mobile device 102 or other electronic source, such as smart watch 116, via wireless communication or data transmission over one or more radio links or digital communication channels.

In some embodiments, the server 104 may receive various information as to whether the customer 108 redeemed the reward upon permission by the customer 108. In response, the server 104 (e.g., insurance server) may update or adjust an auto, personal, health, or other insurance premium or discount to further incentivize repeated behavior. Additionally or alternatively, the server 104 may use the information as to whether the customer 108 redeemed the reward to determine future customer rewards. For example, if the server 104 receives information indicating that the customer 108 quickly redeemed a reward of a gift certificate apparel store, the server 104 may determine that a similar reward at an increased value (e.g., a gift certificate of greater value to the same store) may be offered to the customer 108 if the customer 108 continues to exhibit risk averse behaviors. Further, if the server 104 receives information indicating that most customers 108 quickly redeem an offered gift certificate to the apparel store, the server 104 may determine that a gift certificate to the same store may be an appropriate reward for another one or more similar customers 108.

In some embodiments, one or more portions of the server 104 may be implemented as one or more storage devices that are physically co-located with server 104, or as one or more storage devices utilizing different storage locations as a shared database structure (e.g., cloud storage). In some embodiments, server 104 may be configured to perform any suitable portion of the processing functions remotely that have been outsourced by the mobile device 102. For example, mobile device 102 may collect pan-telematics data 106 as described herein, but may send the pan-telematics data 106 to server 104 for remote processing or analysis by the server 104 instead of processing the pan-telematics data locally. In such embodiments, server 104 may receive and process the pan-telematics data to generate a customer-specific reward.

In some embodiments, the server 104 may be part of a risk-based computing system, such as an insurer computing system, (or facilitate communications with an insurer computer system), and as such, may access databases (e.g., insurer databases) as needed to perform risk-related (e.g., insurance-related) functions. Accordingly, data received from mobile device 102 may include customer credentials, which may be verified by server 104 or one or more other external computing devices or servers. These customer credentials may be associated with an insurance profile, which may include, for example, financial account information, insurance policy numbers, a description and/or listing of insured assets, vehicle identification numbers of insured vehicles, addresses of insured users, contact information, premium rates, discounts, and the like. In this way, data received from mobile device 102 may allow server 104 to uniquely identify each insured customer and facilitate communication of rewards to their insurance customers for their review, modification, approval, and/or use.

The mobile device 102 may include a display 222, a controller 224, a GPS unit 226, a communication unit 228, a sensor array 230 (e.g., one or more cameras, accelerometers, gyroscopes, magnetometers, barometers, thermometers, proximity sensors, light sensors, Hall Effect sensors, radar units), and one or more user-input devices (not shown), such as a keyboard, mouse, microphone, or any other suitable user-input device. The communication unit 228 may provide input signals to the controller 224 via the I/O circuit 232, receive pan-telematics data 106 from other electronic sources external to the mobile device 102 (e.g., a smart watch 116, a smart home 110, and/or a smart vehicle 118), and/or may transmit collected pan-telematics data 106, sensor data, device status information, control signals, or other output from the controller 224 to server 104.

The one or more sensors of the sensor array 230 may be positioned to generate pan-telematics data 106 regarding the speed, force, heading, and/or direction associated with movements of (i) the customer 108 to track fitness levels of the customer 108, and/or (ii) the customer's vehicle to track risk averse driving behavior or patterns, for example. Accordingly, the mobile device 102 may receive or generate pan-telematics data 106 about the customer 108 (and/or the customer's 108 vehicle) via the one or more sensors of the sensor array 230.

Similar to controller 202 of the server 104, the controller 224 of the mobile device 112 may include a program memory 234, one or more processors 236 (e.g., microcontrollers or microprocessors), RAM 238, and I/O circuit 232, all of which are interconnected via an address/data bus 240. The program memory 234 may include an operating system 242, a data storage 244, a plurality of software applications 246, and/or a plurality of software routines 248. The operating system 242, for example, may include one of a plurality of general purpose or mobile platforms, such as the Android™, iOS®, or Windows® operating systems.

The data storage 244 may include data such as customer profiles and preferences (e.g., customer 108's ID, preferred merchants, pan-telematics data 106 about customer 108), application data for the plurality of applications 246, and/or routine data for the plurality of routines 248. In some embodiments, the controller 224 may also include, or otherwise be communicatively connected to, other data storage mechanisms (not shown), such as hard disk drives, optical storage drives, or solid state storage devices.

As discussed with reference to the controller 202, it should be appreciated that although FIG. 2 depicts only one processor 236, the controller 224 may include multiple processors 236. Processor 236 may be configured to execute any of one or more of the plurality of software applications 246 and/or any one or more of the plurality of software routines 248 residing in the program memory 234, in addition to other software applications. Similarly, the controller 224 may include multiple RAMs 238 and multiple program memories 234. RAM 238 and program memory 234 may be semiconductor memories, magnetically readable memories, or optically readable memories, for example.

In embodiments where the mobile device 102 performs both the front end and back end processing, data storage 244 and/or program memory 234 may store various software applications 246 implemented as machine-readable instructions, which may include a behavior tracking application 250 and a reward determination application 252. The behavior tracking application 250 may analyze pan-telematics data 106 received by the communication unit 228 or generated via the sensor array 230 as behavior of the customer 108 attributable to a particular field.

The analysis may include accepting behavior that lowers risk for the entity (e.g., fitness behavior, risk averse driving behavior), and rejecting behavior that increases risk for the entity (e.g., excessive alcohol consumption, driving at excessive speeds, respectively). Such analysis may be facilitated by rules incorporated in the behavior tracking application 250 that define acceptable behaviors that lower risk for the entity. In some embodiments, this analysis step may be unnecessary if the pan-telematics data 106 is, by default, associated with behavior that lowers risk for the entity. Other software applications 246 may include applications that monitor the customer's home or office at the customer's employer. Such applications may feed data to the behavior tracking application 250 to track behaviors affiliated with securing a home (e.g., locking doors), energy efficiency (e.g., turning off office lights), and/or vehicle operation (such as indicated by vehicle telematics data indicating speed, cornering, location, acceleration, braking, etc.).

The behavior tracking application 250 may also track the behavior to determine whether the behavior is repeatedly demonstrated over a predetermined period of time and/or risk averse. For example, the behavior tracking application 250 may receive health data, such as the number of steps taken, miles ran, or calories burned by the customer 108 from the mobile device 102, and track the day and/or time such health data was received, as well as the frequency of receiving such health data. If the frequency exceeds a predetermined configured threshold defined by the behavior tracking application 250 (e.g., received health data for 15 days out during a period of 30 days), behavior tracking application 250 may categorize the behavior as a repeatedly demonstrated behavior.

In response to determining that the behavior has been repeatedly demonstrated over a predetermined period of time and/or is risk averse, the mobile device 102 may generate, via reward determination application 252, a customer-specific reward relevant to a documented interest of the customer 108 that is proportional to the behavior and further lowers the risk for the entity upon using/redeeming the reward. For example, pan-telematics data 106 indicative of behavior of customer 108 that is associated with the health field may be assigned, by the mobile device 102, a preconfigured weight correlated to the behavior (e.g., higher weight for longer repeatedly demonstrated behavior) and/or propensity of the behavior lowering risk for the entity, where the preconfigured weight would be used by the algorithm to generate a reward.

To generate the reward, the reward determination application 252 may access preapproved merchant data and customer 108's preferences stored in database 254 or program memory 234 (or alternatively, database 204 or program memory 208), and execute various functions and tasks associated with generating the reward. The processor 236 may be configured to execute the reward determination application 252 to generate the reward for the customer 108 that is aligned to the one or more of the customer-selected merchants, and store the generated reward to the data storage 244 as reward data 262. Generating the reward for the customer 108 may include accessing the reward data 262 to determine a previously offered reward for the customer 108, such that evolving rewards (e.g., rewards increasing in value and/or pertinence to the customer may be generated). The mobile device 102 may communicate information associated with the received or processed pan-telematics data 106, such as the generated customer-specific reward, via communication unit 228 to the display 222 (such as via wireless communication or data transmission over one or more radio links or digital communication channels).

Although the behavior tracking application 250 and the reward determination application 252 are illustrated as separate applications, in some embodiments, one application may be configured to perform the functionalities of both the behavior tracking application 250 and the reward determination application 252. The various software applications may be executed by the same computer processor 236 or by different computer processors. The various software applications 246 may call various software routines 248, such as behavior tracking routine 256 and a reward determination routine 258 to execute the various software applications 246.

Exemplary Pan-Telematics Data

In addition to applications and routines, the data storage 244 may store various data, such as behavior tracking data 260 and/or reward data 262. In one embodiment, the data storage 244 may include pan-telematics data 264. In other embodiments, pan-telematics data 264 may be stored in database 204 managed by server 104. Exemplary pan-telematics data 264 is shown in FIG. 3.

In some embodiments, pan-telematics data 264 may represent data originating from various electronic sources (such as home, vehicle, or other smart sensors) affiliated with various fields that are communicated to the mobile device 102 to effectuate control of a reward generation process at the mobile device 102, server 104, or both. In other embodiments, pan-telematics data 264 may represent data originating from the sensor array 230 of the mobile device 102 itself. The pan-telematics data 264 may include data representing various statistics that may describe a certain behavior.

Figure 3:
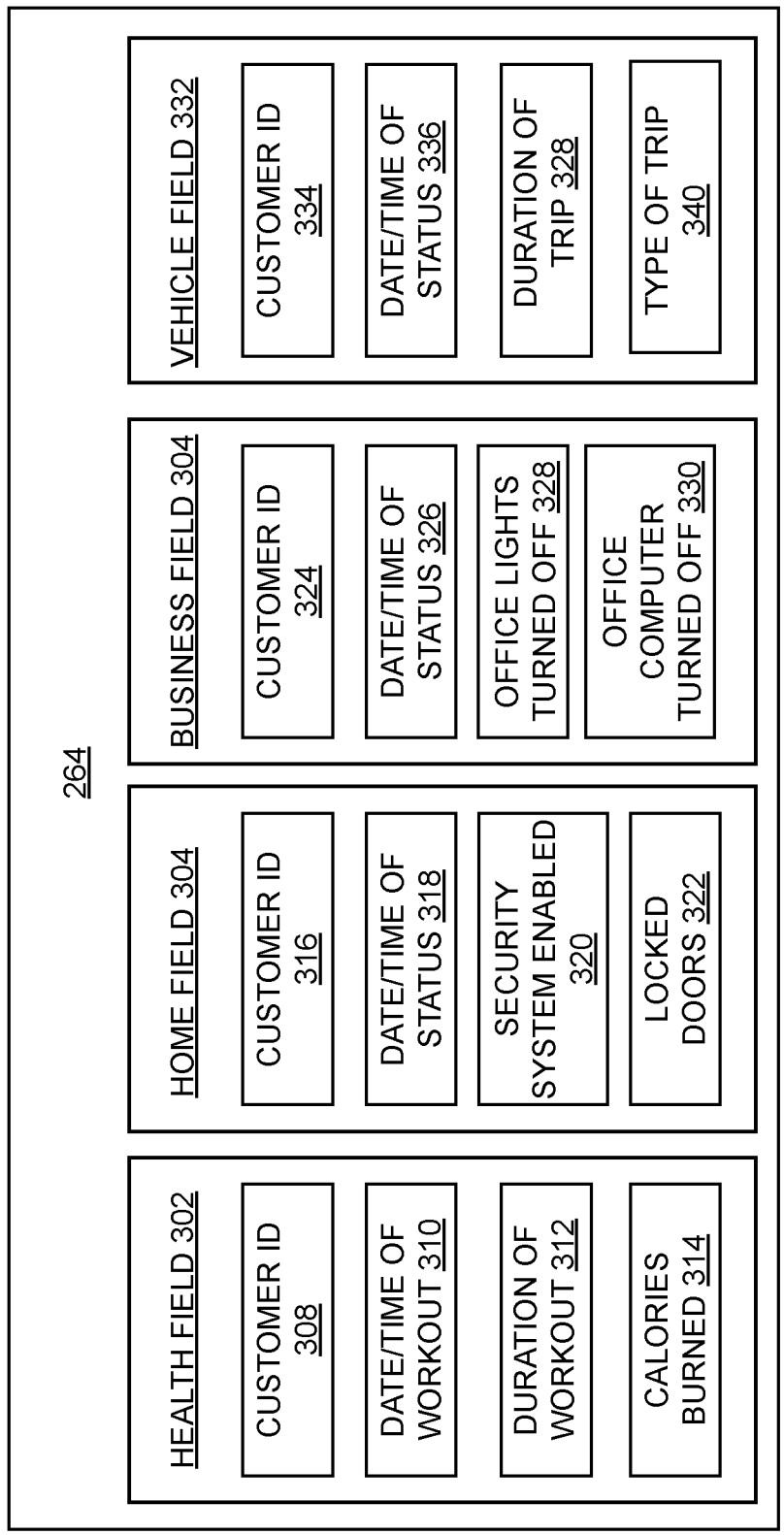
FIG. 3 illustrates exemplary pan-telematics data according to one embodiment.

As shown in FIG. 3, exemplary statistics associated with the health field 302 may describe customer 108's fitness that originates from a smart watch 116, mobile device 102, or other fitness tracking electronic device, such as a pedometer configured to communicate with the behavior-based reward system 100 or 200. The statistics may include information such as identification 308 of the customer who exercised (i.e., customer ID), date/time of a workout 310, duration of the workout 312, calories burned 314, and/or any other pertinent statistical information. Such data may demonstrate fitness behavior of the customer 108 as it relates to the health field.

As another example, exemplary statistics associated with the home field 304 may describe the status of the customer 108's home that originates from various sensors (e.g., security system sensor 110), mobile device 102, or other home or vehicle electronic device or application configured to communicate with the behavior-based reward system 100 or 200. The statistics may include information such as identification 316 of the customer of the home (i.e., customer ID), date/time of the status measurement 318, whether a security system and/or a hazard alarm system has been enabled 320, or whether doors have been locked 322, and/or any other pertinent statistical information. Statistics associated with the home field 332 may further include data indicating one or more home appliances within a period of warranty. Such data demonstrates home care behavior of the customer 108 as it relates to the home field.

As another example, exemplary statistics associated with the business field 306 may describe the characteristics of an entity that customer 108 works for, such as the entity's level of energy efficiency, which may originate from various sensors (e.g., light detecting sensor 112), mobile device 102, or other entity surveillance device or application configured to communicate with the behavior-based reward system 100 or 200. The statistics may include information such as identification 324 of the customer working at the entity (i.e., customer ID), date/time of the status measurement 246, whether office lights have been turned off 320, or the office computer has been turned off 322, and/or any other pertinent statistical information. The statistics may include data reflecting security system and/or hazard alarm system has been enabled at the office and/or property of interest to the business. Such data demonstrates office care behavior of the customer 108 as it relates to the business field.

As another example, exemplary statistics associated with the vehicle field 332 may describe customer or vehicle ID 334, data and/or time of vehicle status 336, duration of a trip using the vehicle 338, and/or type of trip 340 (e.g., city or rural trip). The vehicle field 332 may include vehicle telematics data detailing operation of a vehicle 118, such as speed, acceleration, braking, and cornering related data. The vehicle may be an autonomous or semi-autonomous vehicle in some embodiments.

The behavior-based reward system 100 or 200 may acquire pan-telematics data 264 for one or more fields for each customer. For example, if the customer 108 owns both smart watch 116 and has installed smart home devices (e.g., security system sensor 110) to monitor the security at home, the behavior-based reward system 100 or 200 may collect pan-telematics data 264 that are gathered from both sources and generate rewards based upon both sets of pan-telematics data 264. The processor 236 may then analyze the behavior tracking data 260 to determine whether it has been repeatedly demonstrated.

The processor 236 may then receive data identifying customer-selected merchants from server 104 prior to generating a reward. For example, in some embodiments, the processor 236 may transmit a query to server 104 managing a rewards database in order to receive data identifying customer-selected merchants from server 104.

Exemplary Graphical User Interface

Figure 4A:
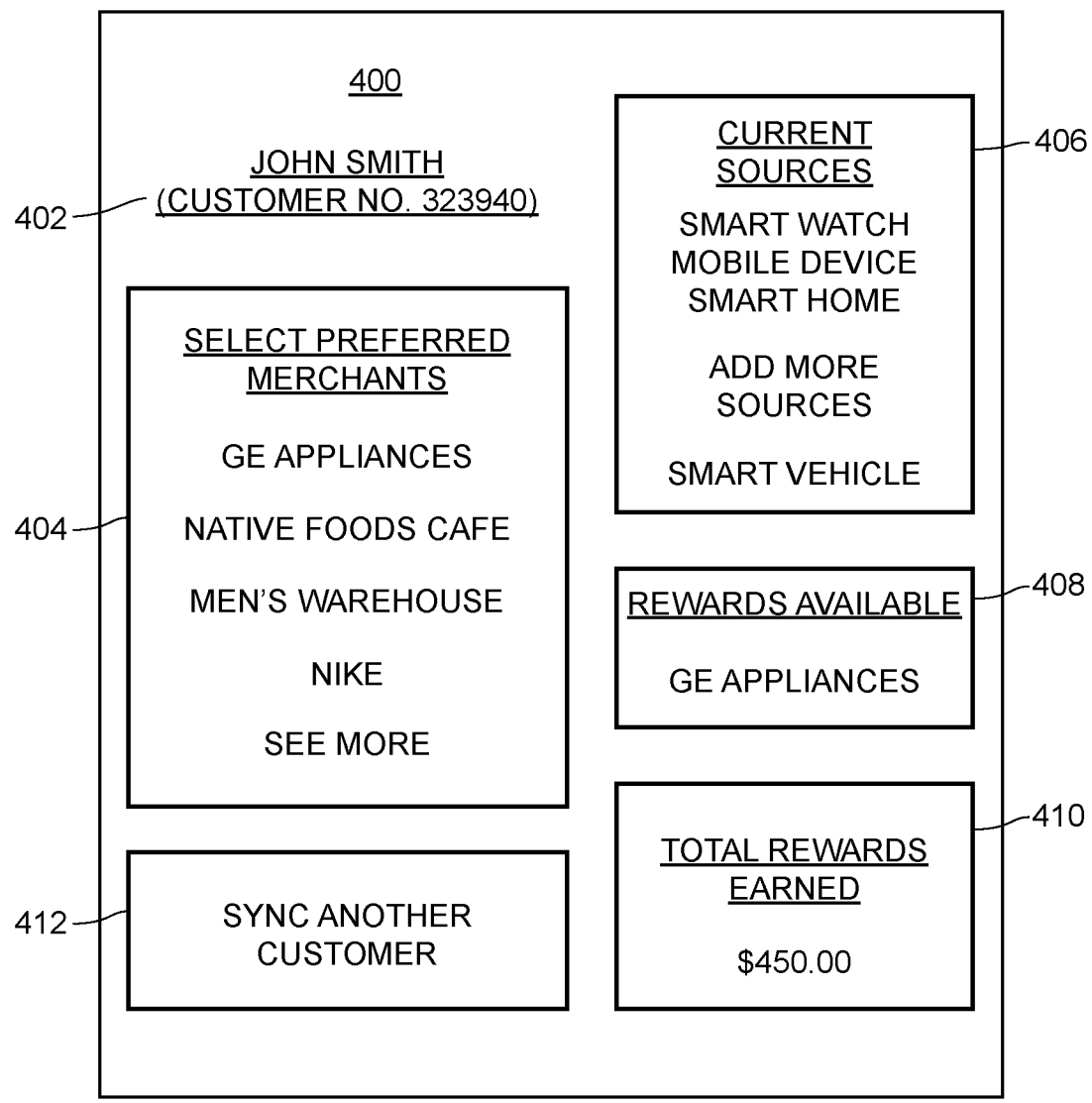
FIG. 4A illustrates an exemplary user interface according to one embodiment.

In some embodiments, the processor 236 may be configured to execute an end user application 266 that has a graphical user interface (GUI) to generate, for example, a display window 400, as shown in FIG. 4A.

The customer 108 may primarily rely on the end user application 266 to configure various electronic sources onto the behavior-based reward system 100 or 200, as well as keep track of his behavior along with associated rewards. The display window 400 may depict (1) the customer 108's name and/or customer number 402; (2) a preferred merchants selection box 404 that allows the customer 108 to select or enter in merchants he would like to receive rewards for; (3) current sources indicator 406 that shows which electronic sources (such as smart watches, mobile devices, wearables, smart home, and/or smart vehicle) the customer currently has configured to receive pan-telematics data 264 from and the option to add additional sources to earn more rewards; (4) an available rewards indicator 408 that shows the currently earned rewards in the customer 108's account; and/or (5) a total rewards earned indicator 410 that keeps a running total of the rewards earned. The display window 400 may also include a "sync another customer" box 412 that allows the customer 108 to enter in the name or customer number of another customer to view that customer's reward information upon permission by the other customer.

Figure 4B:
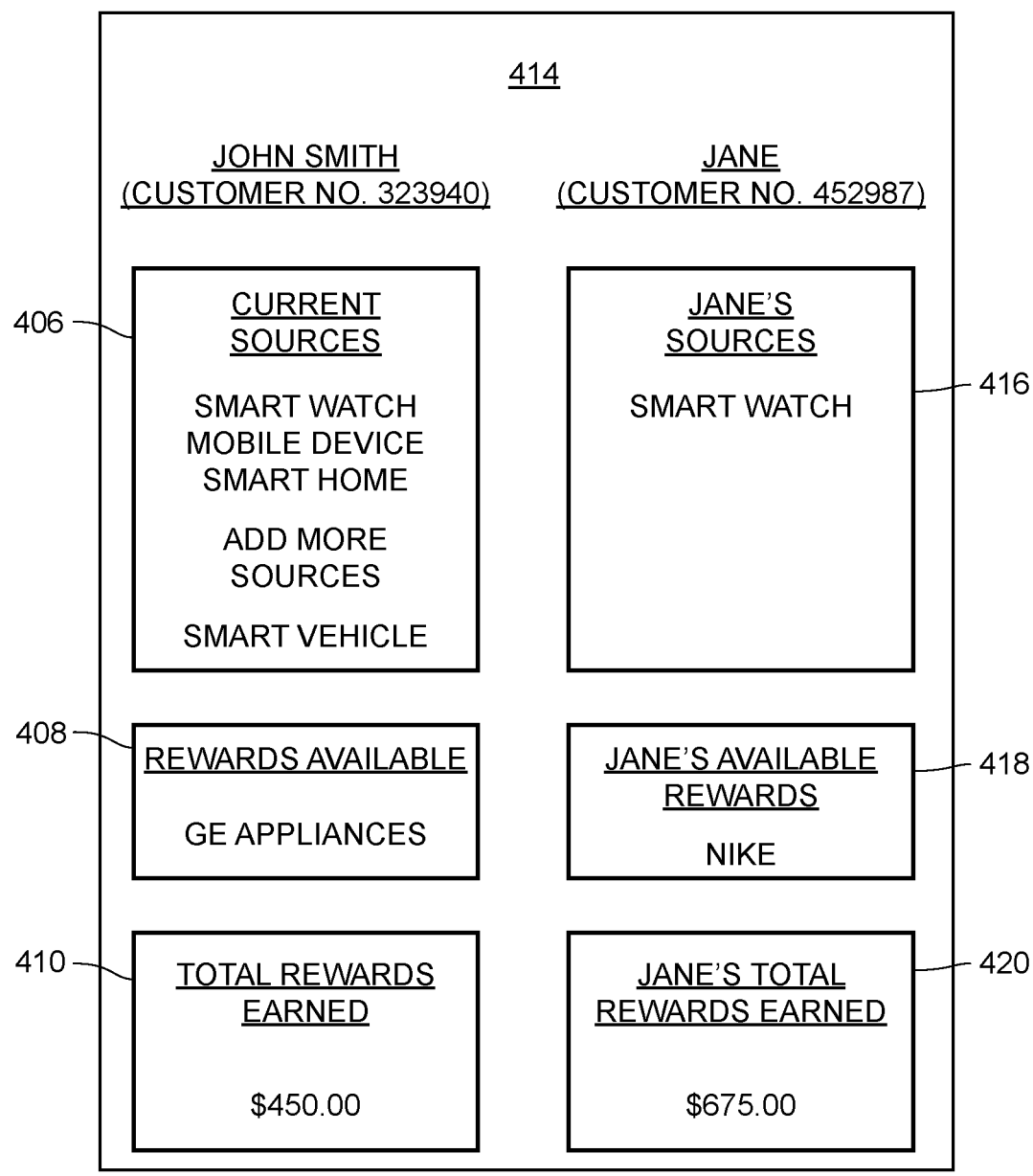
FIG. 4B illustrates another exemplary user interface according to one embodiment.

As shown in FIG. 4B, display window 414 may show rewards information of the other customer. For example, if John selects and/or enters in Jane or her customer number in the "sync another customer" box 412 of display window 400, John may view display window 414 that shows which electronic sources Jane is using to track pan-telematics data (i.e., Jane's sources indicator 416), which rewards Jane currently has earned (i.e., Jane's reward indicator 418), and Jane's total rewards earned (i.e., Jane's rewards earned indicator 420). Display window 414 may also show a side-by-side comparison of the customer 108's rewards information alongside that of the other customer. As such, John may be able to compare Jane's rewards information with his as he is able to view his current sources indicator 406, available rewards indicator 408, and total rewards earned indicator 410 in the same display window 414.

Viewing other customers' reward information via the display window 414 may incentivize both customers to earn more rewards and even promote friendly competition. The end user application 266 may further encourage such competition between customers. For example, the display window 414 may display an offer to match another customer's rewards. For instance, the display window 414 may display a match offer to John, allowing John to earn or "match" one or more of Jane's available rewards or earned rewards. John may match Jane's rewards, for example, if John exhibits one or more behaviors with which Jane's rewards are associated, or if John exhibits similarly risk averse behaviors.

Exemplary Computer-Implemented Method

Figure 5:
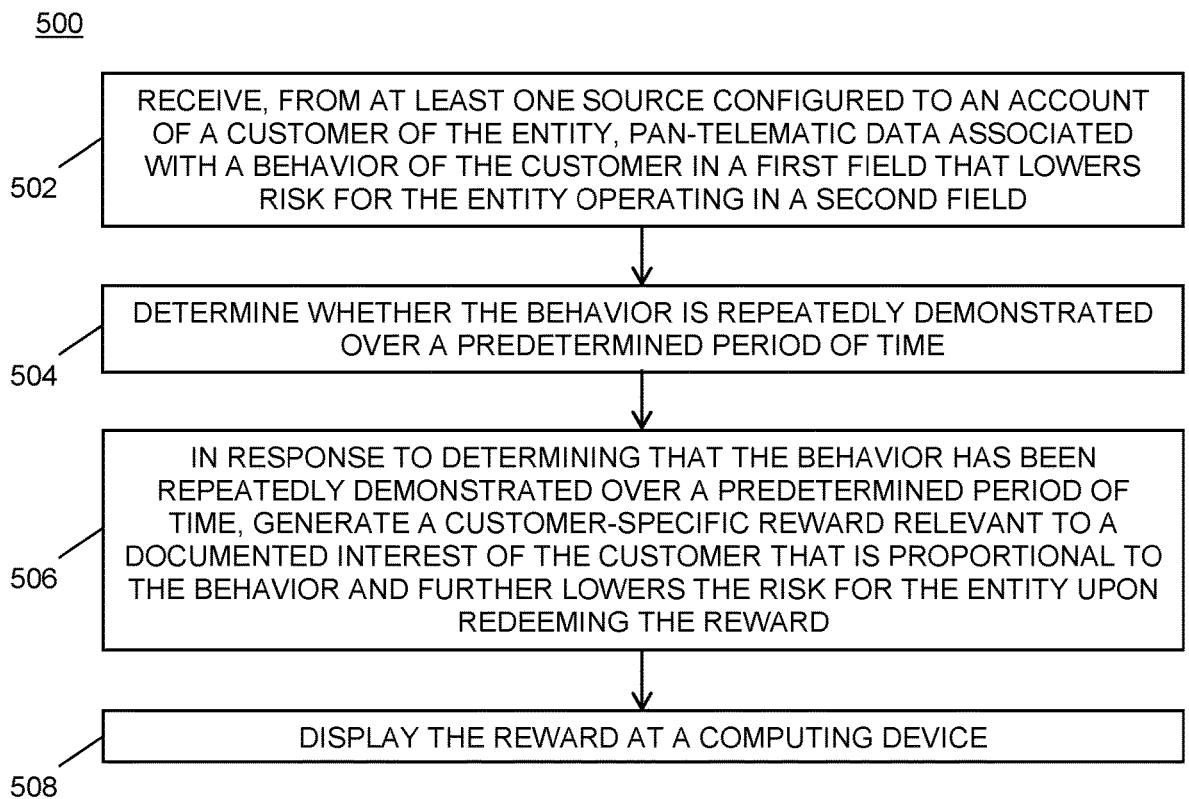
FIG. 5 illustrates an exemplary flowchart for generating behavior-based rewards according to one embodiment.

FIG. 5 illustrates a computer-implemented method 500 for generating behavior-based rewards. The method 500 may be implemented, in whole or in part, by the behavior-based reward system 100 or 200 shown in FIGS. 1 and 2, implemented via one or more processors (e.g., processor 210 or processor 236), transceivers, and/or sensors, and/or via computer-executable instructions stored on non-transitory computer-readable medium or media. Accordingly, in some embodiments, server 104 having access to pan-telematics data 264 may carry out the method. In other embodiments, mobile device 102 having memory that stores pan-telematics data 264 may carry out the method. In other embodiments, mobile device 102 may retrieve pan-telematics data 264 from server 104 and subsequently carry out the method. The method 500 may be stored in memory (e.g., program memory 208/234) or a database (e.g., database 204/254) as one or more instructions or routines.

Figure 6:
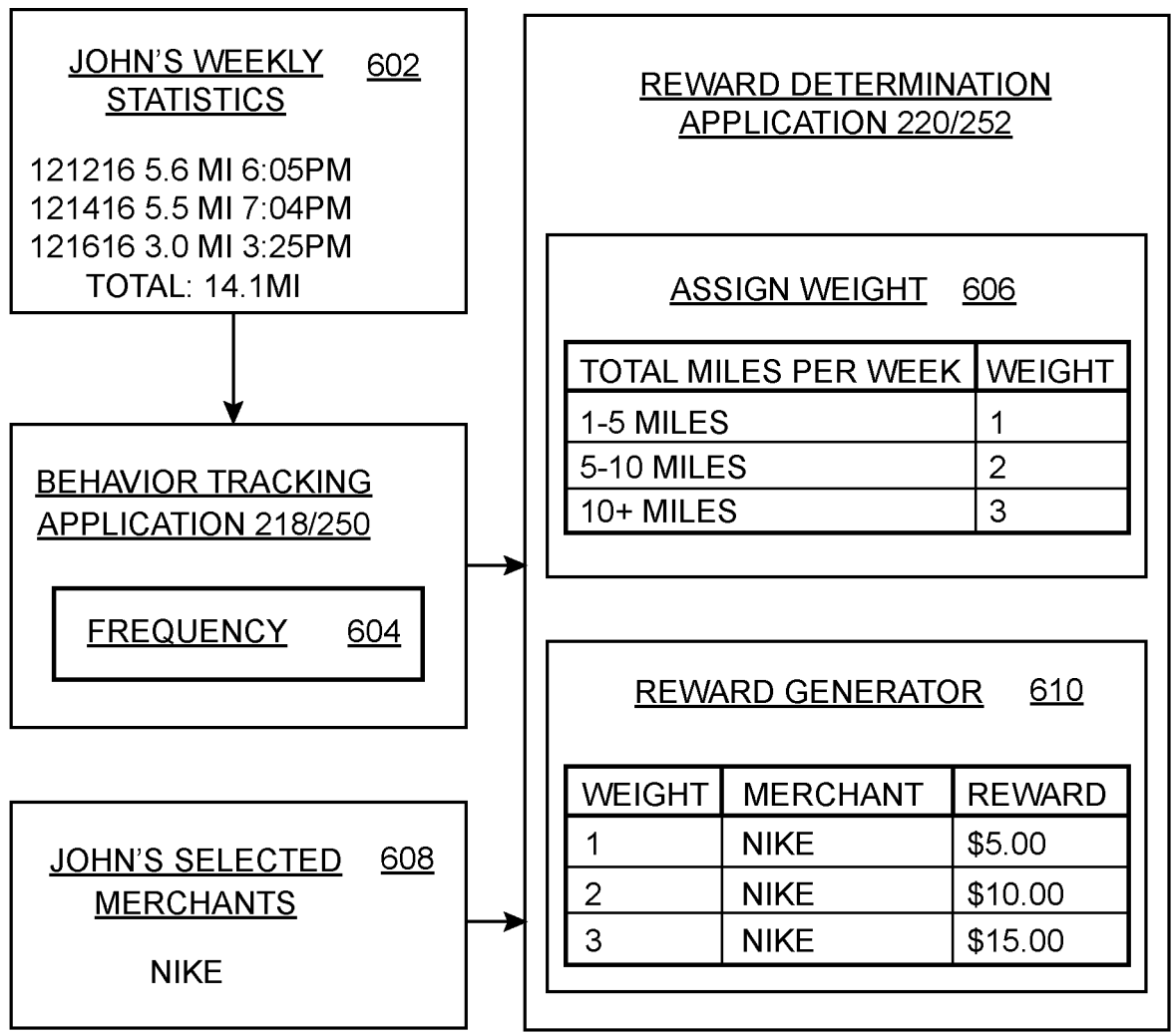
FIG. 6 illustrates a block diagram of an exemplary behavior tracking application and reward determination application according to one embodiment.

The method 500 may begin by the behavior-based reward system 100 or 200 receiving, from at least one source configured to an account of a customer of the entity, pan-telematics data associated with a behavior of the customer in a first field that lowers risk for the entity operating in a second field (502). By way of example, an illustration of the pan-telematics data is shown by pan-telematics data 602 in FIG. 6. Customer 108 named John may have registered smart watch 116 for use with a registered account on the behavior-based reward system 100 or 200. The behavior-based reward system 100 or 200 may receive, from smart watch 116, fitness statistics that describe how many miles John ran on certain days and times. Because a behavior such as running regularly may lower risk for an entity operating in the field of insurance for example, the behavior-based reward system 100 or 200 (specifically the behavior tracking application 218 or 250) may accept the behavior as a qualified behavior that is deserving of further processing to determine whether John deserves a reward for the behavior.

The method 500 may then determine whether the behavior is repeatedly demonstrated over a predetermined period of time (504). By way of example, behavior tracking application 218 or 250 may include a frequency algorithm 602 to assess whether the received pan-telematics data 602 indicates a behavior that has been repeatedly demonstrated over a predetermined period of time. The frequency algorithm 602 may be configured as a rule that passes through pan-telematics data 602 that indicates running at least 3 miles for 3 out of a period of 7 days as repeatedly demonstrated behavior, as an example. Any pan-telematics data 602 that does not meet the rule may be rejected by the frequency algorithm 602 and not further processed by the behavior tracking application 218 or 250. As such, the received pan-telematics data 602 that meets the rule may be transmitted from the behavior tracking application 218 or 250 to the reward determination application 220 or 252.

In response to determining that the behavior has been repeatedly demonstrated over a predetermined period of time, method 500 may then generate a customer-specific reward relevant to a documented interest of the customer that is proportional to the behavior and further lowers the risk for the entity upon redeeming the reward (506). By way of example, reward determination application 220 or 252 may run a weight algorithm 606 that assigns a preconfigured weight correlated to the behavior and/or propensity of the behavior lowering risk for the entity to the pan-telematics data 602. As illustrated, because pan-telematics data 602 shows a total of 14.1 miles within a week, a weight of "3" may be assigned to the pan-telematics data 602.

To generate the reward, reward determination application 220 or 252 may have access to preapproved merchant data and customer preferences 608 stored in database 254 or program memory 234 (or alternatively, database 204 or program memory 208), and execute various functions and tasks, such as reward generator 610. The reward generator 610 may receive the weight assigned to the pan-telematics data 602 (e.g., "3") by the weight algorithm 606 and the customer preferred merchant (e.g., "Nike") from the customer preferences 608 to generate a $15 gift certificate to Nike.

Method 500 may then display the reward to customer 108 via display 222 (508). Although the rewards are described as gift certificate, other forms of a reward are contemplated, such as credit card points, coupons, and the like.

The reward generator 610 may also update the reward by assigning greater weights (e.g., "4") to pan-telematics data 602 that demonstrates behavior that has been repeatedly demonstrated even further (e.g., running more than 10 miles per week for 2 consecutive weeks), where greater weights are keyed to greater rewards (e.g., $20 gift certificate). Accordingly, if the customer 108 continues to repeatedly show demonstrated behavior, the reward may evolve (e.g., increase in monetary value, increase in frequency of offering, and/or increase in pertinence to the customer 108).

In some embodiments, the method 500 may also include determining (e.g., via one or more processors), whether or not the customer has accepted (e.g., acknowledged or redeemed) the displayed reward. If it is determined that the customer has not accepted the reward, the method 500 may include offering an alternate reward. Acceptance or non-acceptance of rewards may be utilized in generation and/or determination of future rewards for the customer or for other customers.

The method 500 may include additional, fewer, or alternate actions, including those described herein.

Exemplary Reward Cycles

Figure 7:
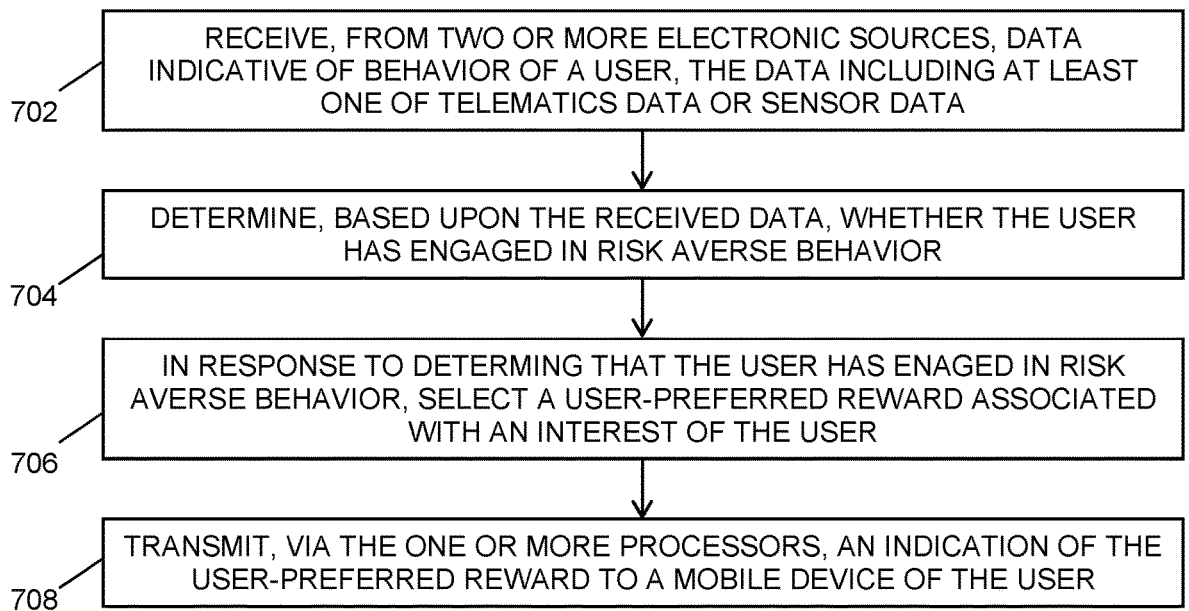
FIG. 7 illustrates an exemplary computer-implemented method of collecting and monitoring pan-telematics data, and issuing user-preferred rewards intended to incentivize further risk averse behavior.

FIG. 7 illustrates an exemplary computer-implemented method 700 of collecting and monitoring pan-telematics data, and issuing user-preferred rewards intended to incentivize further risk averse behavior. The method 700 may be performed by the behavior-based reward system 100 or 200, or by another suitable system.

The method 700 may include receiving, from two or more electronic sources via one of more processors, data indicative of behavior of a user (e.g., a customer), the data including at least one of telematics data or sensor data. The user data may include, for example, vehicle sensor data, vehicle telematics data, home/business sensor data, home/business telematics data, data received via a mobile computing device (e.g., a smartphone), data received via a wearable device (e.g., a smart watch), and/or other sensor or telematics data, such as the data described with regard to FIG. 3. Accordingly, the two or more electronic sources may include sensors and/or smart devices associated with a home, business, vehicle, or user, including any of the electronic sources discussed in this detailed description.

In any case, the data may, in some embodiments, be received at a remote server or processor via wireless communication or data transmission transmitted by one or more transceivers associated with the multiple electronic sources over one or more radio links or communication channels.

The method 700 may also include determining, via the one or more processors, based upon at least the received data, whether the user has engaged in risk averse behavior or a healthy lifestyle (704). Risk averse behavior may include behavior that reduces risk to an insured item (e.g., a vehicle, a home, a business, a personal article, or oneself) and/or avoidance of behavior that would increase risk to an insured item. In some embodiments, determining whether the user has engaged in a risk averse behavior may include determining whether the user has illustrated a pattern or a total amount of risk averse behavior, and/or determining whether the user has followed one or more recommendations (e.g., a recommendation provided by an insurer) intended to mitigate or prevent damage to an insured item.

The method 700 may also include, in response to determining that the user has engaged in risk averse behavior, selecting, via the one or more processors, a user-preferred reward associated with an interest of the user (706). In some embodiments, the user-preferred reward may include a reward selected by the user. Additionally or alternatively, the user-preferred reward may include a reward determined to be of interest to the user. In any case, the user-preferred reward may include a reward that further lowers risk for the user or for an entity associated with the user. For example, a user-preferred reward may include a discounted gym membership or a gift certificate to an athletic apparel store, which may reduce risk for a user owning a health or life insurance policy.

The method 700 may also include transmitting, via the one or more processors, the user-preferred reward (or an indication thereof) to a mobile device of the user (708). In other words, the user-preferred reward may be transmitted (e.g., transmitted via wireless communication or data transmission over one or more radio links or communication channels) in the form of the reward itself (e.g., a code serving as a gift certificate to an apparel store) or some other notification that the user has received, will receive, or is eligible to receive the reward. In any case, the reward may be transmitted and/or displayed to the mobile device of the user, for example, in the form of a text message, an email, a push notification, a phone call, etc. The reward may include, for example, any of the rewards discussed elsewhere herein.

In some embodiments, elements of the method 700, up to and including the entirety of the method 700, may repeat, creating a telematics data monitoring cycle. In other words, while a user-preferred reward is determined, for example, telematics data may continue to be received or monitored. Further, after transmission of the user-preferred reward, additional telematics data may be received, behavior analyzed, and/or rewards determined and/or transmitted.

The monitoring of multiple sources of telematics data associated with a user may create a holistic view of the user, and the risk averse behaviors that they engage in. As a result, risk averse individuals may be incentivized to engage in further or additional risk averse behavior with rewards. The longer period of time that the individual exhibits risk averse adverse behavior may result in evolving or growing rewards. For example, upon repetition of the method 700, the method 700 may include determining a continued or prolonged exhibition of risk averse behavior, and selecting a user-preferred reward may include selecting an evolved reward (e.g., a reward of greater monetary value, a reward to be offered earlier and/or more frequently, and/or a reward of increased pertinence to the user).

In some embodiments, the method 700 may also include determining, via the one or more processors, whether or not the user has accepted (e.g., acknowledged or redeemed) the displayed reward. If it is determined that the user has not accepted the reward, the method 700 may include offering an alternate reward. Acceptance or non-acceptance of rewards may be utilized in generation and/or determination of future rewards for the user or for other users.

The method 700 may include additional, less, or alternate actions, including those discussed elsewhere herein. Furthermore, one or more elements of the method 700 may proceed in an order different from that depicted herein.

Figure 8:
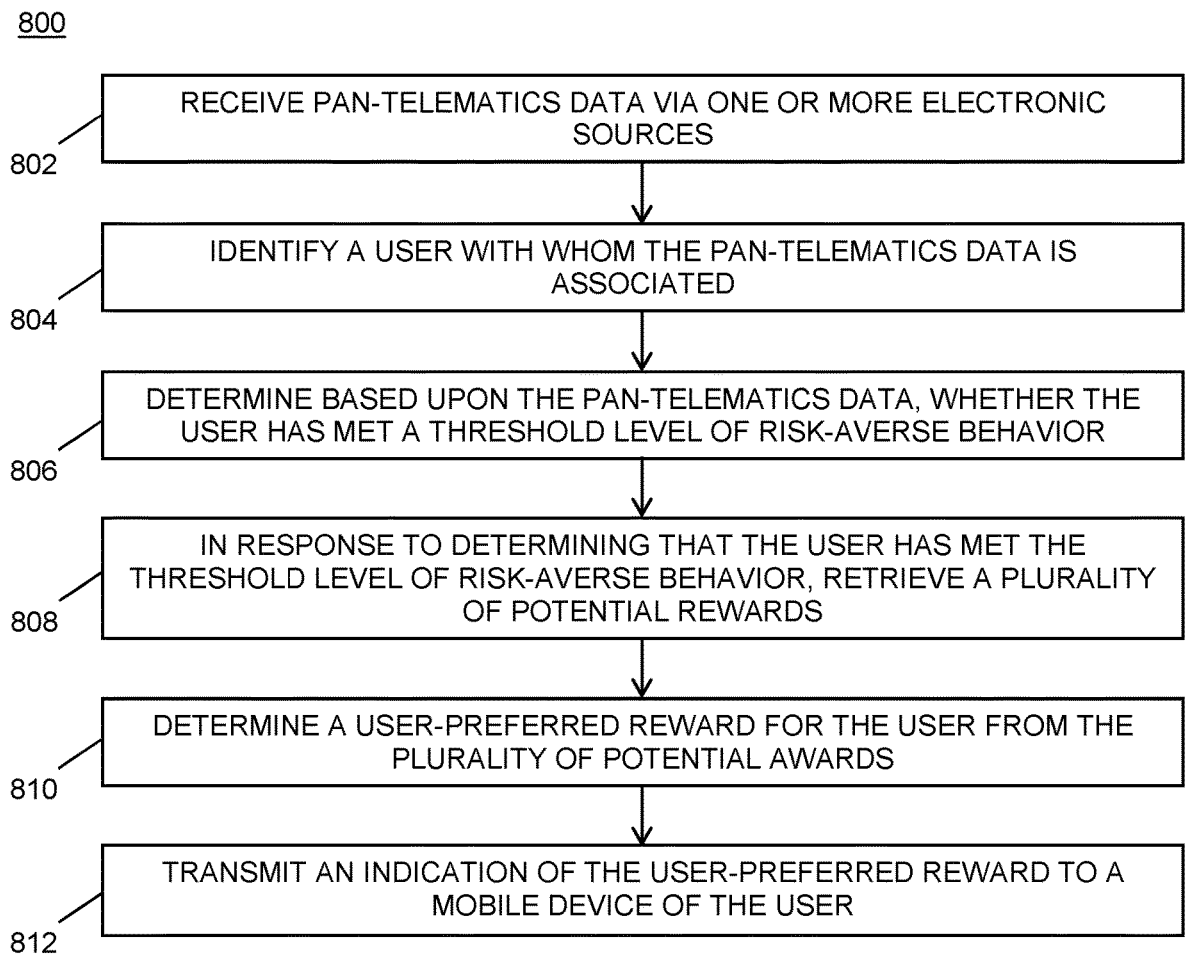
FIG. 8 illustrates another exemplary computer-implemented method of collecting and monitoring pan-telematics data, and issuing user-preferred rewards intended to incentivize further risk averse behavior.

FIG. 8 illustrates another exemplary computer-implemented method 800 of collecting and monitoring pan-telematics data, and issuing user-preferred rewards intended to incentivize further risk averse behavior 800. The method 800 may be performed by the behavior-based reward system 100 or 200, or by another suitable system.

The method 800 may include receiving, via one or more processors, pan-telematics data via one or more electronic sources (802). The one or more electronic sources may, for example, include sensors and/or smart devices associated with a home, business, vehicle, or user, or some combination thereof. Further, the one or more electronic sources may include any of the electronic sources discussed in this detailed description. The data may, in some embodiments, be received at a remote server or processor via wireless communication or data transmission transmitted by one or more transceivers associated with the multiple electronic sources over one or more radio links or communication channels.

The method 800 may also include identifying, via the one or more processors, a user with whom the pan-telematics data is associated (804). For example, data received via sensors and/or devices within a home may be associated with a homeowners or other occupant of the home. As another example, data received via vehicle sensors or other devices located within a vehicle may be associated with an owner, lessee, or driver of the vehicle. In some cases, data may be associated with more than one user, and elements of the method 800 described herein may proceed separately or jointly with regard to each user.

The method 800 may also include determining, via the one or more processors, based upon at least the pan-telematics data, whether the user has met a threshold level of risk-averse behavior (806). Risk averse behavior may include behavior that reduces risk to an insured item (e.g., a vehicle, a home, a business, a personal article, or oneself) and/or avoidance of behavior that would increase risk to an insured item. In some embodiments, determining whether the user has met the threshold level of risk averse behavior may include determining whether the user has illustrated a pattern or a total amount of risk averse behavior over a period of time, and/or determining whether the user has followed one or more recommendations (e.g., a recommendation provided by an insurer) intended to mitigate or prevent damage to an insured item.

The method 800 may also include, in response to determining that the user has met the threshold level of risk-averse behavior, retrieving, via the one or more processors, a plurality of potential rewards (808). The plurality of potential rewards, may include, for example, one or more rewards of a magnitude or category for which the user is eligible. Additionally or alternatively, the plurality of potential rewards may include one or more rewards determined to be of at least some interest to the user. In some embodiments, one or more of the plurality of potential rewards may be displayed to the user to allow the user to select a reward.

The method 800 may also include determining, via the one or more processors, a user-preferred reward for the user from the plurality of potential awards (810). In some embodiments, the user-preferred reward may include a reward selected by the user (e.g., from among presented options including the aforementioned plurality of rewards). Additionally or alternatively, the user-preferred may include a reward determined to be of interest to the user. In any case, the user-preferred reward may include a reward that further lowers risk for the user or for an entity associated with the user. For example, a user-preferred reward may include a discounted gym membership or a gift certificate to an athletic apparel store, which may reduce risk for a user owning a health insurance policy.

The method 800 may also include transmitting, via the one or more processors, the user-preferred reward (or an indication thereof) to a mobile device of the user (812). In other words, the user-preferred reward may be transmitted (e.g., transmitted via wireless communication or data transmission over one or more radio links or communication channels) in the form of the reward itself (e.g., a code serving as a gift certificate to an apparel store) or some other notification that the user has received, will receive, or is eligible to receive the reward. In any case, the reward may be transmitted and/or displayed to the mobile device of the user, for example, in the form of a text message, an email, a push notification, a phone call, etc. The reward may include, for example, any of the rewards discussed elsewhere herein.

In some embodiments, elements of the method 800, up to and including the entirety of the method 800, may repeat, creating a pan-telematics data monitoring cycle. In other words, while a user-preferred reward is determined, for example, telematics data may continue to be received or monitored. Further, after transmission of the user-preferred reward, additional telematics data may be received, behavior analyzed, and/or rewards determined and/or transmitted.

In some embodiments, the method 800 may also include determining, via the one or more processors, whether or not the user has accepted (e.g., acknowledged or redeemed) the displayed reward. If it is determined that the user has not accepted the reward, the method 800 may include offering an alternate reward. Acceptance or non-acceptance of rewards may be utilized in generation and/or determination of future rewards for the user or for other users.

The monitoring of multiple sources of telematics data associated with a user may create a holistic view of the user, and the risk averse behaviors that they engage in. As a result, risk averse individuals may be incentivized to engage in further or additional risk averse behavior with rewards. The longer period of time that the individual exhibits risk averse adverse behavior may result in evolving or growing rewards. For example, upon repetition of the method 800, the method 800 may include determining a continued or prolonged exhibition of risk averse behavior, and selecting a user-preferred reward may include selecting an evolved reward (e.g., a reward of greater monetary value, a reward to be offered earlier and/or more frequently, and/or a reward of increased pertinence to the user).

The method 800 may include additional, less, or alternate actions, including those discussed elsewhere herein. Furthermore, one or more elements of the method 800 may proceed in an order different from that depicted herein.

In one aspect, a computer-implemented method, carried out by one or more processors, for generating behavior-based rewards may be provided. The method may include, via one or more processors, transceivers, servers, and/or sensors: (1) receiving (via wireless communication or data transmission over one or more radio links or digital communication channels), from two or more sources (of telematics or pan-telematics data) configured to an account of a user of an entity, pan-telematics data associated with a behavior of the user in a first field that lowers risk for the entity operating in a second field; (2) determining whether the behavior is risk averse and/or repeatedly demonstrated (such as 2, 3, 4, 5 or more times) over a predetermined period of time (day, week, month, quarter of a year, half year, year, etc.); (3) in response to determining that the behavior is risk averse and/or has been repeatedly demonstrated over a predetermined period of time, respectively, generating a user-specific reward relevant to a documented or predetermined interest of the user that is proportional to the behavior, and further lowers the risk for the entity upon using the reward; and/or transmitting (via wireless communication or data transmission over one or more radio links or digital communication channels) a virtual representation of, and/or an electronic message detailing the reward, to a mobile device of the user for display or otherwise displaying the reward to facilitate incentivizing risk averse behavior. The method may include additional, less, or alternate actions, including those discussed elsewhere herein.

Exemplary Utilization of User and Vehicle Data

In addition to or alternatively to collecting and analyzing telematics data (e.g., vehicle pan-telematics data) the systems and methods described may collect and analyze data indicative of vehicle care pertaining to the vehicle 118.

Vehicle care may include maintenance to or service of the vehicle 118 (e.g., a comprehensive checkup, an oil change, an air filter change, a wheel alignment, etc.). Such maintenance data may indicate that a user of the vehicle 118 (e.g., the customer 108) has obtained or personally performed risk-mitigating maintenances or services on the vehicle 118. Additionally or alternatively, vehicle care may include installation of one or more functional and/or cosmetic parts (e.g., new brake pads, new headlights, snow tires during winter months, etc.). Such parts data may indicate risk aversion on the part of the user (e.g., timely replacement of parts with a known lifetime, and/or dynamic equipment of the vehicle in response to or anticipation of changing driving conditions). The behavior-based reward system 100 or 200 may receive the above-described vehicle care data from at least one electronic source. The at least electronic source may include, for example, a mobile device 102 of the user, another computing device of the user, a computing device of a vehicle maintenance/service entity, a computing device of a vehicle part manufacturer, a computing device of an insurance provider, or another suitable source described in this detailed description.

Generally, risk averse behaviors such as the vehicle maintenance actions and part configurations described above may be associated with risk averse behaviors or lowered risk associated with an entity (e.g., a home 110 of the user, a business 112 of the user, the general health of the user, etc.) operated by the user in another field, especially when the risk averse behaviors are repeatedly demonstrated over a period of time. For example, proper maintenance of the vehicle 118 by the user may be associated with, and/or may be used to predict, similar maintenance of a home 110 of the same user. Thus, the vehicle care data may be utilized to determine a level of risk in the same field or another field and generate rewards to be transmitted to the user.

In response to determining that vehicle care to the vehicle 118 is associated with the lowered risk associated with the entity operated by the user in the other field, the behavior-based reward system 100 or 200 may generate one or more user-specific rewards relevant to a documented interest (e.g., a gift certificate to a store of interest to the user). The user-specific reward may be proportional to the vehicle care to the vehicle 118, and the reward may further lower the risk for the entity upon using the reward. For example, a user-specific reward may include a proportionally valued gift certificate to a home improvement retail store, and use of the gift certificate may further lower the risk for the home 110 of the user (e.g., via purchase and anticipated installation of hardware that lowers risk of an electrical fire within the home 110). Rewards, including evolving and/or escalating rewards, may be generated via systems and methods similar to those discussed elsewhere herein.

The generated user-specific reward may be transmitted to the user. For example, a virtual representation of the reward, such as an indication of the reward on a web page, may be transmitted to the user. As another example, an electronic message (e.g., a text message or an email message) detailing the reward may be transmitted to the user. Additionally or alternatively, the reward may be transmitted to the user by another suitable means.

In any case, the reward may be transmitted to the mobile device 102 of the user for display on the mobile device 102, for example. The user's rewards, as well as the user's preferred merchants, available rewards, data sources, etc., may be displayed to the user via the display window 400 of FIG. 4A and/or the display window 414 of FIG. 4B (for rewards competition with another user), using similar systems and techniques as described elsewhere herein.

Figure 9:
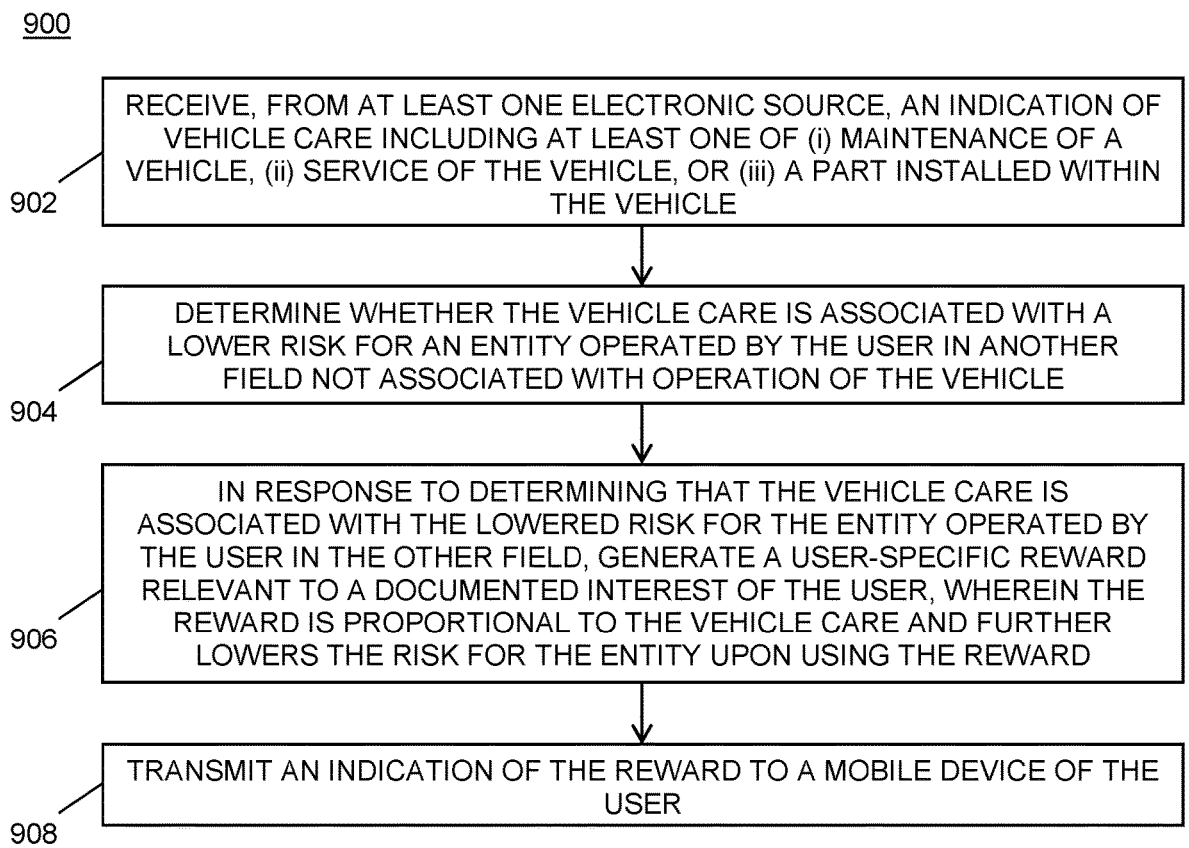
FIG. 9 illustrates an exemplary computer-implemented method of utilizing vehicle care data associated with a user (e.g., a customer) and a vehicle (which may be an autonomous or semi-autonomous vehicle).

FIG. 9 illustrates an exemplary computer-implemented method 900 of utilizing vehicle care data associated with a user (e.g., a customer) and a vehicle (which may be an autonomous or semi-autonomous vehicle). The method 900 may be performed by the behavior-based reward system 100 or 200, or by another suitable system.

The method 900 may include receiving, via one or more processors or one or more transceivers, from at least one electronic source (e.g., a mobile device, a computing device of an insurance entity, a computing device of a vehicle maintenance or vehicle service entity, etc.) an indication of vehicle care including at least one of (i) maintenance of a vehicle, (ii) service of the vehicle, or (iii) a part installed within the vehicle (902). The indication of vehicle care may include data received at a remote server or processor via wireless communication or data transmission transmitted by one or more transceivers associated with the multiple electronic sources over one or more radio links or communication channels.

The method 900 may also include determining, via the one or more processors, whether the vehicle care is associated with a lowered risk for an entity operated by the user in another field (e.g., a home, a business, personal health care, etc.) not associated with operation of the vehicle (904). Determining whether the vehicle care is associated with the lower risk may include determining that the vehicle care or another form of vehicle care is repeatedly demonstrated over a predetermined period of time (to provide evolved rewards, for example).

The method 900 may also include, in response to determining that the vehicle care is associated with the lowered risk for the entity operated by the user the other field, generating, via the one or more processors, a user-specific reward relevant to a documented interest of the user that is proportional to the at vehicle care, wherein the reward is proportional to the vehicle care and further lowers the risk for the entity upon using the reward (906). Generating the user-specific reward may include assigning, via the one or more processors, a weight to the vehicle care, and generating, via the one or more processors, the user-specific reward based upon the assigned weight. In some embodiments, the user-specific reward may be identified from a list of candidate rewards selected by the user. Further, the user-specific reward may be redeemable within a field associated with operation of the vehicle (e.g., a gift certificate redeemable at an auto parts store) or the other field (e.g., a gift certificate redeemable at a store pertaining to the other field).

The method 900 may also include, still in response to determining that the vehicle care is associated with the lowered risk for the entity operated by the user the other field, transmitting, via the one or more processors or the one or more transceivers, an indication of the reward to a mobile device (e.g., a smartphone) of the user (908). The indication may include, for example, a virtual representation of (e.g., a web page) the reward, or an electronic message (e.g., a text message or email message) detailing the reward. Additionally or alternatively, the method may include causing the reward to be displayed to the user via another suitable means.

In some embodiments, the method 900 may further include (i) receiving, via the one or more processors or the one or more transceivers, data indicative of vehicle care of another vehicle associated with another user, wherein the vehicle care of the other vehicle includes at least one of (a) maintenance of the other vehicle, (b) service of the other vehicle, or (c) a part installed within the other vehicle; and (ii) displaying the data via the one or more processors. Displaying vehicle care data of the other user to the first user may allow the two users to compete for each other's evolving rewards, for example.

Exemplary Machine Learning

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as pan-telematics data, electronic sources that generate pan-telematics data, preferred merchants, desired rewards, entity risk, frequency statistics that may be set as a threshold to develop rules to determine the frequency algorithm 604, and the like.

Some embodiments described herein may include automated machine learning to determine whether behavior is repeatedly demonstrated over a predetermined period of time, and/or generate a customer-specific reward relevant to a documented interest of the customer that is proportional to the behavior and further lowers the risk for the entity upon using/redeeming the reward. For example, behavior tracking application 218 or 250 may utilize the frequency algorithm 602 to add up occurrences of a certain behavior (e.g., accumulating miles ran) prior to comparing the number of occurrences of the behavior to the predetermined configured threshold defined by the behavior tracking application when categorizing the behavior as a repeatedly demonstrated behavior.

Behavior tracking application 218 or 250 may also subtract occurrences of a certain behavior from the total number of occurrences of the behavior if the behavior has not been repeatedly demonstrated. The automated machine learning may also maintain the total number of occurrences of a behavior if it determines that the customer 108 is undergoing an abnormal event, such as recovering from surgery as determined from medical sensors configured onto the behavior-based reward system 100 or 200.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element (e.g., mobile device 102 and/or server 104 of FIGS. 1 and 2) may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as frequency statistics that may be set as a threshold to develop rules to determine the frequency algorithm 604), in order to make earning reward feasible for customers. Models may be created based upon example inputs of data in order to make valid and reliable predictions for novel inputs.

Additionally or alternatively, the machine learning programs may be trained by inputting sample data sets or certain data into the programs, such as the behavior tracking application 218 or 250 and reward determination application 220 or 252 discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

ADDITIONAL CONSIDERATIONS

All of the foregoing methods discussed herein may be include additional, less, or alternate actions, including those discussed elsewhere herein. All of the foregoing methods may be implemented via one or more local or remote processors, transceivers, servers, and/or sensors, and/or via computer-executable instructions stored on computer-readable medium or media. The foregoing devices and systems may also include additional, less, or alternate functionality, including that discussed elsewhere herein.

Although the text herein sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, the modules described herein may be implemented mechanically or electronically. For example, a module may comprise dedicated circuitry or logic that may be permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that may be temporarily configured by software to perform certain operations. It will be appreciated that the decision to implement a module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

The patent claims at the end of this patent application are not intended to be construed under 35 U.S.C. § 112(f), unless traditional means-plus-function language, such as "means for" or "step for" language, is explicitly recited in the claim(s). The systems and methods described herein are directed to an improvement in computer functionality, and improve the functioning of conventional computers.

What is claimed:

1. A computer-implemented method for utilizing data associated with a user of a vehicle, comprising:
receiving, via one or more processors or one or more transceivers, from at least one electronic source, an indication of vehicle care that has been performed upon a vehicle, the vehicle care including at least one of (i) maintenance of the vehicle, (ii) service of the vehicle, or (iii) a part installed within the vehicle;
determining, via the one or more processors, whether the performed vehicle care is associated with a lowered risk for an entity operated by the user in another field not associated with operation of the vehicle; and
in response to determining that the performed vehicle care is associated with the lowered risk for the entity operated by the user in the other field,
generating, via the one or more processors, a user-specific reward relevant to a documented interest of the user that is proportional to the performed vehicle care, wherein use of the reward further lowers the risk for the entity upon using the reward, transmitting, via the one or more processors or the one or more transceivers, a virtual representation of, or electronic message detailing, the reward to a mobile device of the user for display, or otherwise causing the reward to be displayed to the user, and via the one or more processors, periodically monitoring the performed vehicle care to determine whether to subsequently modify the generated reward to maintain proportionality of the generated reward to the performed vehicle care.

2. The method of claim 1, wherein generating the user-specific reward comprises:

assigning, via the one or more processors, a weight to the vehicle care; and generating, via the one or more processors, the user-specific reward based upon the assigned weight.

3. The method of claim 1, wherein the user-specific reward is identified from a list of candidate rewards selected by the user.

4. The method of claim 1, wherein the user-specific reward is redeemable within a field associated with operation of the vehicle or the other field.

5. The method of claim 1, wherein the electronic source is a mobile device of the user.

6. The method of claim 1, wherein the electronic source is a computing device of a vehicle maintenance or vehicle service entity.

7. The method of claim 1, wherein the electronic source is a computing device of an insurance entity.

8. The method of claim 1, further comprising:

receiving, via the one or more processors or the one or more transceivers, data indicative of vehicle care of another vehicle associated with another user, wherein the vehicle care of the other vehicle includes at least one of (i) maintenance of the other vehicle, (ii) service of the other vehicle, or (iii) a part installed within the other vehicle; and displaying the data via the one or more processors.

9. The method of claim 1, wherein determining that the vehicle care is associated with the lowered risk for the entity operated by the user in the other field comprises determining that the vehicle care is repeatedly demonstrated over a predetermined period of time.

10. A computer system configured to utilize data associated with a user of a vehicle, the computer system comprising:

one or more processors; and one or more computer memories comprising computer-executable instructions that, when executed by the one or more processors, causes the computer system to:

receive, via the one or more processors or via one or more transceivers, from at least one electronic source, an indication of vehicle care that has been performed upon the vehicle, the vehicle care including at least one of (i) maintenance of a vehicle, (ii) service of the vehicle, or (iii) a part installed within the vehicle;

determine, via the one or more processors, whether the performed vehicle care is associated with a lowered risk for an entity operated by the user in another field not associated with operation of the vehicle; and in response to determining that the performed vehicle care is associated with the lowered risk for the entity operated by the user in the other field, generate, via the one or more processors, a user-specific reward relevant to a documented interest of the user that is proportional to the performed vehicle care, wherein use of the reward further lowers the risk for the entity upon using the reward, transmit, via the one or more processors or the one or more transceivers, a virtual representation of, or electronic message detailing, the reward to a mobile device of the user for display, or otherwise causing the reward to be displayed to the user, and via the one or more processors, periodically monitor the performed vehicle care to determine whether to subsequently modify the generated reward to maintain proportionality of the generated reward to the performed vehicle care.

11. The computer system of claim 10, wherein generating the user-specific reward comprises:

assigning, via the one or more processors, a weight to the vehicle care; and generating, via the one or more processors, the user-specific reward based upon the assigned weight.

12. The computer system of claim 10, wherein the user-specific reward is identified from a list of candidate rewards selected by the user.

13. The computer system of claim 10, wherein the user-specific reward is redeemable within a field associated with operation of the vehicle or the other field.

14. The computer system of claim 10, wherein the electronic source is a mobile device of the user.

15. The computer system of claim 10, wherein the electronic source is a computing device of a vehicle maintenance or vehicle service entity.

16. The computer system of claim 10, wherein the electronic source is a computing device of an insurance entity.

17. The computer system of claim 10, wherein the computer-executable instructions, when executed by the one or more processors, further cause the computer system to:

receive, via the one or more processors or the one or more transceivers, data indicative of vehicle care of another vehicle associated with another user, wherein the vehicle care of the other vehicle includes at least one of (i) maintenance of the other vehicle, (ii) service of the other vehicle, or (iii) a part installed within the other vehicle; and display the data via the one or more processors.

18. The computer system of claim 10, wherein determining that the vehicle care is associated with the lowered risk for the entity operated by the user in the other field comprises determining that the vehicle care is repeatedly demonstrated over a predetermined period of time.

* * * * *